Patented July 20, 1937

2,087,682

UNITED STATES PATENT OFFICE 2,087,682

PROCESS FOR PRODUCING POUR INHIBITORS FOR WAX-CONTAINING OILS

Garland H. B. Davis, Baton Rouge, La., and Charles C. Swoope, Bayonne, N. J., assignors to Standard Oil Development Company No Drawing. Application November 19, 1931, Serial No. 576,208

14 Claims. (Cl. 87—9)

The present invention relates to the art of producing oils of low cold test from oils containing waxy hydrocarbons, and more specifically, to an improved method for preparing a pour inhibiting substance which may be added to the wax-containing oils. The invention will be fully understood from the following description:

In a prior patent U. S. 1,815,022 issued July 14, 1931, a process for producing low cold test oils from wax-containing hydrocarbons is disclosed. In this patent the particular method disclosed comprises the addition to the oil of a small amount of a class of substances comprising low temperature aluminum chloride condensation products of paraffin wax and aromatic hydrocarbons such as naphthalene. The present invention is an improved method for producing these condensation products whereby materials of superior inhibiting powers are produced.

In the prior known method of producing condensation products of the class described for pour inhibiting purposes, the condensation is preferably carried out between a chlorinated derivative of paraffin wax and a hydrocarbon such as naphthalene at low temperatures, say from room temperature to about 160° F. But it was stated that at the end of the reaction, or in order to force the reaction to its conclusion the temperature is gradually raised to about 200° F. and held at that point for a short while. The purpose of this step was stated to be in order to bring the reaction to its conclusion and, furthermore, it served to put the aluminous sludge in such a condition that it might be readily settled from the oil. It has now been discovered that it is preferable to keep the temperature at all times below about 125° F., or even lower, for example, at 100° F., and to discontinue the reaction before it has reached its final stage. In this manner especially powerful inhibitors can be produced. Further reaction does not entirely destroy the inhibiting properties of the product, but the desired property appears to reach the optimum at a certain stage of the reaction and to decrease if the further chemical change is allowed to proceed. But this proposed method of stopping the reaction before reaching its final stage has several objections the chief of which is that under such conditions, and especially when relatively small proportions of aluminum chloride are used, there is great difficulty in bringing about a separation of the sludge and the recovery of the oily product.

It has been discovered, however, that the sludge produced in the intermediate stages of the reaction may be readily broken out and removed by the addition of a suitable hydrolytic agent such as water or alkali either of which has the power to decompose the aluminum chloride catalyst, or other materials of the same class such as zinc chloride, iron chloride and boron fluoride. The products of the hydrolysis as well as the excess of the hydrolyzing agent may be readily removed from the oil either by settling or by centrifugal means, or in any other satisfactory manner. There is sometimes difficulty on account of emulsification, and in such cases the addition of a small amount of alcohol 2, 3, 5 or 10% of ethyl or isopropyl, or other water-soluble alcohols, or other equivalent materials are useful addition agents to break or prevent the formation of emulsions. While caustic soda, or carbonate is usually preferred as the hydrolytic agent, other alkalis may be used such as ammonia, potash or a slurry of lime. After the aqueous layer has been removed the oil may be washed with water or may be finished in any other means, for example, it may be washed with other suitable purifying agents and/or treated with clay either in a finely divided form, or the oil may be allowed to percolate through a bed of clay of large particle size. This latter treatment produces a lighter colored stock for blending purposes. Lower boiling portions of the condensation product and the waxy products may be removed by distillation in which the temperature is preferably held at or below about 650° F., and the residue containing the active pour inhibitor is recovered.

It will be understood that the power or potency of the condensation product for pour inhibiting purposes is dependent on many factors; for example, it is found that the chlorparaffin or other halogenide varies with different grades of wax and with different temperatures of chlorination. Wax free of oil is preferred, or at least, with a relatively small proportion say 1.5 to 2% of oil and the temperature from 130 to 300° F. is preferred for chlorination, which is allowed to proceed preferably to about 12%. About 15 parts by weight of naphthalene or other aromatic hydrocarbons to about 100 of the chlorinated paraffin is perhaps the most desirable proportion, although it may be varied without greatly changing the pour inhibiting properties, and may be quite different with other aromatics. Obviously, it is desirable to use as little of the aluminum chloride, or other catalyst, as possible and 7½ pounds per 100 pounds of chlorinated paraffin has been found to be quite satisfactory. Five pounds appears to be equally good and even smaller amounts say 3 or 3½ pounds may be used, but in such case there is even greater difficulty in separating the sludge from the oil and greater need for the improved method of separation. The catalyst may be added all at once or slowly or at intervals of time such as every ¼ or ½ hour or every hour until the total is used.

When small amounts of aluminum chloride are used greater care should be taken to obtain violent and thorough agitation. Temperature should be maintained as low as possible with due regard to a commercial rate of reaction. With a high degree of agitation lower temperatures are permissible, and for large scale commercial equipment 125° F. or 110°, or even 100° or 70° F. have been found satisfactory.

The most suitable time of reaction is, of course, dependent on the temperature, the particular catalyst and the amount of it used. At lower temperatures shorter times are required. At 80° F., for example, in a large scale unit with the best possible agitation and with about 5 pounds of aluminum chloride per 100 pounds of chlorparaffin, a time of 2 to 10 hours was satisfactory, but in this case it is noted that the reaction has not reached its final stage, and by this is meant that further internal changes will still take place if additional time is provided. A time of 5 or 6 hours is perhaps most satisfactory under the above conditions, and at this time the amount of chlorparaffin is reduced below 5% of the original amount. The aluminous sludge is usually found to be extremely difficult to settle. In fact, it may be said that the best pour inhibiting product is produced during the time interval when the chlorparaffin is reduced to below 3, or 2 or preferably 1% of the original quantity and the time when settling becomes rapid. The best time to discontinue is when the chlorparaffin is below 1% or even completely exhausted and when settling is most difficult, although, of course, it is difficult to stop at this precise point at which all chlorparaffin has just reacted. During this time or at this particular point, however, separation of the material by means of a hydrolytic agent is relatively easy. As an illustrative example of the improved operation the following experiment may be considered:

100 parts of chlorinated paraffin wax is prepared by passing chlorine through a melted wax which contains less than 2% of oil. The chlorination takes place in about 20 hours, and to this product, which contains about 12% chlorine, 15 parts of naphthalene are added. The whole is now brought in solution by the addition of 175 parts of a good grade of kerosene; 3½ parts of anhydrous aluminum chloride are slowly added while the mixture is held at a temperature of about 85° F. and thoroughly agitated. A jacketed vessel is satisfactory for this purpose. After 2½ hours an aliquot part is removed and the reaction is stopped by hydrolyzing with aqueous caustic soda to which 3% of isopropyl alcohol has been added. The sample is finished by removing the soda solution, washing the oil with water, contacting with clay and distilling off the diluent. A 1% blend of this synthetic product in a Manchester spindle oil of 35° F. normal pour point shows a reduced pour point of +20° F., and the sample as originally withdrawn is found to contain 20% of its original chlorparaffin. The reaction is then continued for 5½ hours longer and a second sample is withdrawn and treated in substantially the same manner as the first. This sample reduces the pour point of the spindle oil to −5° F. when used in 1% proportion. The amount of chlorparaffin in the second sample is practically negligible being below 1% and the sludge cannot settle of itself. Continuing the reaction further produced less reactive pour inhibitors although the sludge appeared to settle with less difficulty.

The above description is based on the use of chlorinated paraffin wax but it should be understood that other halogenated derivatives or olefines derived from paraffin wax, for example, by formation of olefines by splitting out hydrochloric acid from chlorparaffin by known methods, may be used in place of and are the equivalent of the chlorinated wax. Similarly, the aromatics may be eliminated, and condensation or polymerization of chlorparaffin or other halogenides, or other olefines derived from paraffin, or mixtures of these substances, may be used to produce excellent pour inhibitors by this method.

In the following claims when the terms condensation product derived from paraffin wax or from paraffin wax and naphthalene are used, it is intended to include the condensation product of the active wax derivatives disclosed above whether produced by chlorination or by first obtaining the olefine and either produced in the presence or in the absence of aromatic hydrocarbons.

The invention is not to be limited by any theory of the mechanism of pour reduction, nor by the chemical reactions involved in the preparation of the pour inhibitors or which may occur in the pour inhibiting process, but only to the following claims in which it is desired to claim all novelty inherent in the invention.

We claim:

1. An improved process for producing condensation products valuable as pour inhibitors comprising the steps of bringing about a condensation of a material selected from the group consisting of a halogenated waxy hydrocarbon or olefins of the type derived from said halogenated hydrocarbons at a low condensation temperature under the influence of a catalyst of the aluminum chloride type, stopping the reaction before its normal conclusion whereby valuable inhibiting powers are preserved.

2. An improved process for producing valuable pour inhibiting substances comprising the steps of condensing a material selected from the group of substances consisting of chlorinated derivatives of paraffin wax or olefins derived therefrom through the agency of a catalyst of the aluminum chloride type, stopping the reaction before its normal conclusion at a point when the aluminous sludge settles with difficulty, and recovering the oily product.

3. An improved process for producing valuable pour inhibiting substances comprising the steps of condensing active derivatives of paraffin wax selected from the group consisting of chlorinated wax or olefins derived therefrom through the agency of a catalyst of the aluminum chloride type, stopping the reaction by addition of a hydrolyzing agent at the point before the final stage of the reaction so as to provide a reaction time of 2 to 10 hours and where pour inhibiting powers are at a substantial maximum, separating the hydrolytic products of the catalyst and recovering the oily product.

4. An improved process for producing valuable pour inhibiting substances comprising the steps of condensing active derivatives of paraffin wax selected from the group consisting of chlorinated wax or olefins derived therefrom at a temperature below 125° F. through the agency of aluminum chloride, stopping the reaction after a time of about 2 to 10 hours before the final stage, when less than 2% of the active derivative of the wax remains, and when the aluminous sludge settles only with difficulty, by addition of an aqueous agent for hydrolyzing the aluminum chloride, separating the products of hydrolysis and recovering the oily product.

5. Process according to claim 4 in which an aqueous alkali is used as a hydrolyzing agent.

6. Process according to claim 4 in which the hydrolyzing agent comprises aqueous alkali to which a small amount of a soluble alcohol has been added.

7. An improved process for producing valuable pour inhibiting substances comprising the steps of producing a condensation product of chlorinated paraffin wax through the agency of a catalyst of the aluminum chloride type, stopping the reaction by addition of a hydrolyzing agent at a point before the final stage of reaction and where pour inhibiting powers are at a substantial maximum, separating the hydrolytic products of the catalyst and recovering the oily product.

8. An improved process for producing valuable pour inhibiting substances comprising the steps of producing a condensation product of chlorinated paraffin wax at a temperature below 100° F. through the agency of aluminum chloride, stopping the reaction before the final stage after a reaction time of about 2 to 10 hours, and where the aluminous sludge settles only with difficulty, by addition of an aqueous agent for hydrolyzing aluminum chloride, separating the products of hydrolysis and recovering the oil product.

9. An improved process for producing valuable pour inhibiting substances comprising the steps of forming a low temperature condensation product of chlorinated paraffin wax on an aromatic hydrocarbon through the agency of a catalyst of the aluminum chloride type, stopping the reaction by addition of a hydrolyzing agent after a reaction time of 2 to 10 hours and before the final stage of reaction where pour inhibiting powers are at a substantial maximum, separating the hydrolytic products of the catalyst and recovering the oily product.

10. An improved process for producing a valuable pour inhibiting substance comprising the steps of condensing chlorinated paraffin wax on naphthalene at a temperature below 100° F. through the agency of aluminum chloride, stopping the reaction after a reaction time of 2 to 6 hours where less than 1% of the chlorparaffin remains and where the aluminous sludge settles only with difficulty and separating the oily product.

11. An improved process for producing valuable pour inhibiting substances comprising the steps of producing a condensation product of an olefine of the type derived from halogenated paraffin wax through the agency of a catalyst of the aluminum chloride type, stopping the reaction by addition of a hydrolyzing agent at a point before the final stage of reaction where pour inhibiting powers are at a substantial maximum, separating the hydrolytic products of the catalyst and recovering the oily product.

12. An improved process for producing valuable pour inhibiting substances comprising the steps of producing a condensation product of an olefine of the type derived from chlorinated paraffin wax at a temperature below 100° F. through the agency of aluminum chloride, stopping the reaction so as to provide a reaction time of 2 to 10 hours, and where the aluminous sludge settles only with difficulty, by addition of an aqueous agent for hydrolyzing aluminum chloride, separating the products of hydrolysis and recovering the oily product.

13. An improved process for producing valuable pour inhibiting substances comprising the steps of forming a low temperature condensation product of an olefine of the type derived from chlorinated paraffin wax on an aromatic hydrocarbon through the agency of a catalyst of the aluminum chloride type, stopping the reaction by addition of a hydrolyzing agent so as to provide a reaction time of 2 to 10 hours before the final stage of reaction where pour inhibiting powers are at a substantial maximum, separating the hydrolytic products of the catalyst and recovering the oily product.

14. An improved process for producing a valuable pour inhibiting substance comprising the steps of condensing an olefine of the type derived from chlorinated paraffin wax on naphthalene at a temperature below 100° F. through the agency of aluminum chloride, stopping the reaction before the final stage so as to provide a reaction time of about 2 to 6 hours and where the aluminuous sludge settles only with difficulty and separating the oily product.

GARLAND H. B. DAVIS.
CHARLES C. SWOOPE.